United States Patent [19]
Wilde

[11] 4,401,144
[45] Aug. 30, 1983

[54] WHEEL RIMS FOR PNEUMATIC TIRES

[75] Inventor: Ralph Wilde, Samele, England

[73] Assignee: Dunlop Limited, London, England

[21] Appl. No.: 302,592

[22] Filed: Sep. 15, 1981

Related U.S. Application Data

[63] Continuation of Ser. No. 125,584, Feb. 28, 1980, abandoned.

[30] Foreign Application Priority Data

Mar. 7, 1979 [GB] United Kingdom ............... 7908017

[51] Int. Cl.³ .............. B60C 19/04; B60C 15/02; B60C 17/00
[52] U.S. Cl. ............... 152/158; 152/330 RF; 152/330 L; 152/366; 152/379.5; 152/385; 152/396; 301/31; 384/192
[58] Field of Search ............ 152/152, 158, 330 RF, 152/363–366, 378 R, 379.3, 385, 386, 388, 396, 399, 400, 300 L, 379.5, 380, 414; 301/95–98, 30–34; 384/125, 138, 192

[56] References Cited

U.S. PATENT DOCUMENTS

| 2,754,876 | 7/1956 | King | 152/363 |
| 2,913,034 | 11/1959 | Wall | 152/366 |
| 3,682,219 | 8/1972 | Lindley | 152/158 |
| 3,924,670 | 12/1975 | Tangorra et al. | 152/375 |
| 3,965,957 | 6/1976 | Nakasaki | 152/379.3 |
| 4,108,232 | 8/1978 | Simpson | 152/365 |
| 4,173,243 | 11/1979 | Wilde et al. | 152/158 |
| 4,197,892 | 4/1980 | Boileau | 152/158 |
| 4,258,767 | 3/1981 | Wilde | 152/330 L X |
| 4,289,186 | 9/1981 | Wilde | 152/366 X |

FOREIGN PATENT DOCUMENTS 1375415 11/1974 United Kingdom ............... 152/158

*Primary Examiner*—William A. Powell
*Assistant Examiner*—Thomas Bokan
*Attorney, Agent, or Firm*—Stevens, Davis, Miller & Mosher

[57] ABSTRACT

An assembly comprising a wheel rim and an annular safety support member mounted on the rim portion between the rim bead seats and extending radially outwards beyond the rim bead retaining flanges to support a tire mounted on the rim when in a deflated condition. The support member rotates with the rim in the non load-bearing condition but rotates relative to the rim in the load-bearing condition to compensate for circumferential differences between the tire tread and the radially outer surface of the support member. The confronting surfaces on the support member and rim portion are profiled to axially locate the support member on the rim. Preferably the radially inner surface of the support member is of shallow convex profile and the confronting surface on the rim portion is of shallow concave profile.

11 Claims, 5 Drawing Figures

WHEEL RIMS FOR PNEUMATIC TIRES

This is a continuation of application Ser. No. 125,584 filed Feb. 28, 1980 now abandoned.

This invention concerns improvements in or relating to wheel rims for pneumatic tires and in particular to an assembly of a wheel rim and an annular safety support member arranged and adapted to become load-bearing and support a pneumatic tire mounted on the rim when the tire is in a deflated condition.

It is known from U.K. Patent Specification No. 1,375,415 to provide an assembly of the above type in which the support member rotates with the wheel rim when the tire is fully inflated but which rotates relative to the wheel rim when the tire is deflated and supported by the support member. Such relative rotation compensates for the circumferential difference between the tire tread and the radially outer surface of the support member thereby reducing undesirable heat build-up in the tire and consequent destruction of the tire. As a result the vehicle can be driven to a suitable place of repair with the tire in a deflated condition.

In such an assembly where the support member is rotatable relative to the wheel rim under load bearing conditions it is important to ensure the correct axial alignment of the support member on the wheel rim is maintained. In the assembly disclosed in U.K. Patent Specification No. 1,375,451 the wheel rim is a conventional one-piece rim and the support member is located in the usual tire fitting well. Axial alignment of the support member is achieved by the provision of spaced lugs at intervals around the radially inner peripheral portions thereof so that the support member occupies the full width of the well.

A problem arises in axially locating a support member of the type described in U.K. Patent Specification No. 1,375,415 on a well-less wheel rim, e.g. rims having a detachable flange, since the surface of the rim portion between the bead seats is flat. If the radially inner peripheral portion of the support member is constructed to extend across the entire width of the rim portion beteen the bead seats the tire beads engage the support member and considerable frictional resistance to rotation of the support member relative to the rim is produced when the tire is in a deflated condition. Consequently not only is the efficiency of the support member in compensating for the circumferential difference between the tire tread and support member reduced but the tire beads may be damaged necessitating replacement of the tire.

In order to overcome this problem it has been proposed in U.S. Pat. No. 4,173,243 to provide a bearing ring for the support member. The bearing ring is mounted on the surface of the rim portion between the bead seats and is formed with a channel section groove in which the support member is axially located. The bearing ring is held against rotation relative to the wheel rim by the frictional engagement of the tire beads while the support member is free to rotate on the bearing ring when the tire deflates.

The provision of a bearing ring not only increases the number of components of the assembly and hence the cost but also complicates assembly.

It is an object of the present invention to provide a support member, in particular but not exclusively for a well-less wheel rim, which substantially reduces the aforementioned disadvantages.

According to the present invention there is provided an assembly comprising a wheel rim and an annular safety support member adapted to become load bearing and support a pneumatic tire mounted on the rim when the tire is in a deflated condition, the rim having a pair of axially spaced bead seats, each terminating at its axially outer edge in an associated bead retaining flange and an annular rim portion between the bead seats, the support member extending circumferentially around said annular rim portion and projecting radially outwards beyond the bead retaining flanges, the radially inner surface of the support member and the confronting surfaces of said annular rim portion defining complementary locating formations constructed and arranged such that, in use, the support member is rotatable relative to said annular rim portion under load-bearing conditions but is retained against movement in an axial direction relative to the wheel rim.

The complementary locating formations may comprise an annular rib on one of the wheel rim and support member which engages an annular groove or recess of complementary cross-section in the other of the wheel rim and support member. Preferably the groove or recess and the rib are of complementary arcuate cross-section. In one preferred construction the annular rim portion extending between the rim bead seats has a shallow concave profile in cross-section and the confronting surface of the support member has a complementary convex profile in cross-section.

The support member is preferably of the type disclosed in the above-mentioned U.K. Patent Specification No. 1,375,415 and comprises a plurality of elongate arcuate elements attached end-to-end to form an annular hoop. The elements may be made of metal, solid natural or synthetic rubber, or any suitable plastics material or any combination of these materials in sandwich form. The materials may include additives to reinforce the elements and/or provide any other desirable properties.

Preferably means is provided to substantially reduce the friction between the support member and the wheel rim, for example, a lubricant may be provided between the confronting surfaces of the support member and wheel rim during assembly or the lubricant may be contained in containers located in the radially inner surface of the support member and arranged to release the lubricant only when the support member becomes load bearing as described in the assignee's co-pending U.K. Patent Application No. 7908303 published on Oct. 10, 1979 under Ser. No. 2017598A (corresponding to U.S. Pat. No. 4,258,767). Alternatively one or both of the confronting surfaces may be coated with a material having a relatively low coefficient of friction, for example Teflon (Registered Trade Mark).

The wheel rim may have a well, but more preferably the rim is well-less. Thus the rim may have a conventional detachable flange to facilitate fitting of the tire. Alternatively the rim may be of the type disclosed in our co-pending U.K. patent applications as listed below:

Application No. 7,932,158 published under No. 2,030,526 on Apr. 10, 1980;

Application No. 7,932,159 published under No. 2,030,085 on Apr. 2, 1980;

Application No. 7,932,160 published under No. 2,030,086 on Apr. 2, 1980;

Application No. 7,932,161 published under No. 2,030,087 on Apr. 2, 1980; and

Application No. 8,005,931 published under No. 2,044,189 on Oct. 15, 1980.

Where the rim is multi-component sealing means is provided for effecting an air-tight seal at the interface between adjacent rim components. The sealing means may comprise a respective seal element for each interface. Preferably the sealing means comprises a liner member which extends circumferentially around the outer surface of the rim and extends across substantially the entire axial width of the rim. Sealing means comprising a liner member for a multi-component wheel rim is the subject of our co-pending U.S. patent application No. 125,631, filed on Feb. 28, 1980 now U.S. Pat. No. 4,289,186.

The invention will now be described in more detail, by way of example only, with reference to the accompanying drawings wherein.

Figure 1:
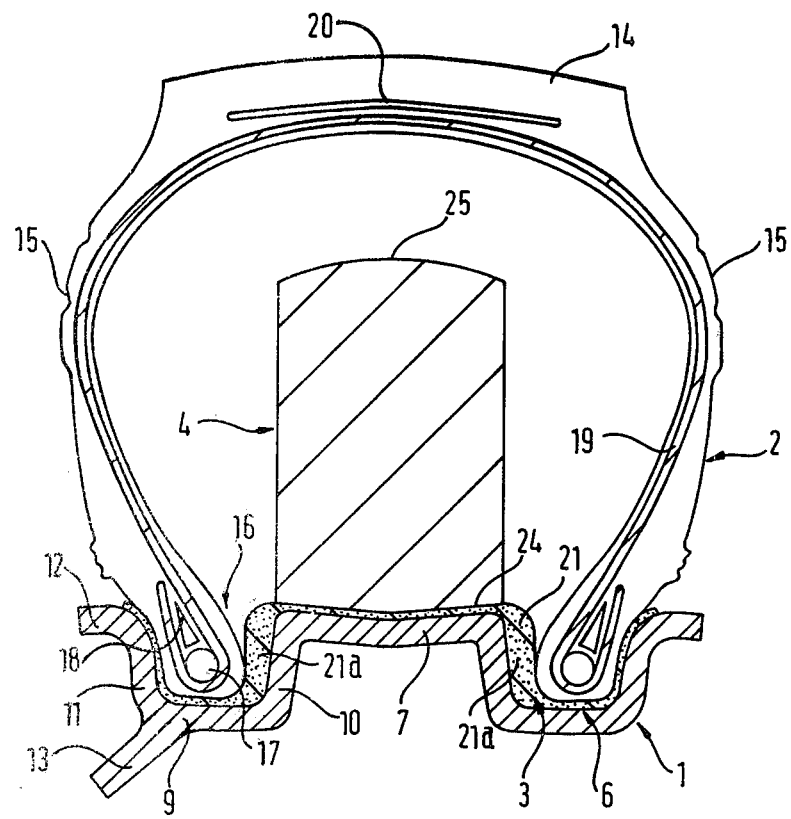
FIG. 1 is a radial cross-section of an assembly according to the present invention with a tire mounted on the rim.

The assembly shown in FIG. 1 of the accompanying drawings comprises a multi-component well-less wheel rim 1 having a radial ply tire 2 mounted thereon, sealing means 3 for effecting an air-tight seal at the interface between adjacent rim components and support member 4 for supporting the tire when in a deflated condition.

Figure 2:
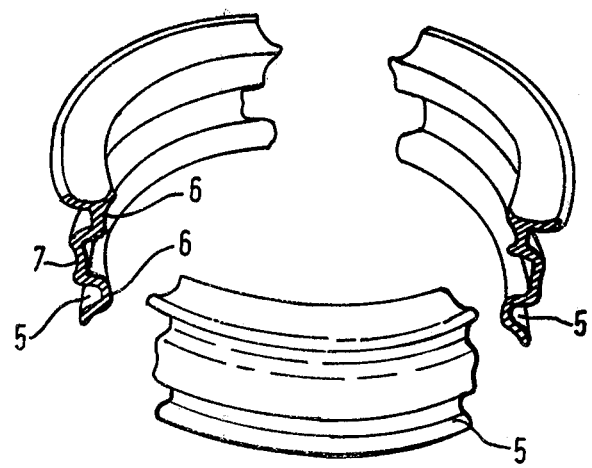
FIG. 2 is an exploded perspective view of the wheel rim shown in FIG. 1.

The multi-component well-less wheel rim 1, formed by three similar rim components 5 shown in FIG. 2, comprises a pair of axially spaced bead seats 6 separated by an annular rim portion 7. The rim profile 7 is of arcuate cross-section having a gentle concave profile. Each bead seat 6 is similar and comprises an annular groove of substantially channel section. Each groove has a base portion 9 and a pair of opposed side portions 10,11 which extend in a generally radially outwards direction relative to the base portion 9. The axially inner side portion 10 of each groove leads to the rim portion 7 while the axially outer side portion 11 of each groove defines a bead retaining flange and terminates in a rolled over radius 12. An annular attachment flange 13 integral with the base portion 9 of each component 5 provides means for attaching the wheel rim 1 to the usual wheel disc (not shown).

The radial ply tire 2 has a tread portion 14, a pair of sidewalls 15, and a pair of annular axially spaced tire beads 16. Each bead 16 is similar and comprises a bead core having a steel wire cable 17 of annular cross-section and a triangular bead apex 18. The bead core is substantially inextensible. A single steel cord ply 19 extends circumferentially around the tire from one bead to the other bead. The ends of the ply 19 are wrapped around the associated bead core. Tread reinforcements indicated generally by the reference numeral 20 are provided radially outwards of the ply 19 and reinforce the crown of the tire.

Each bead 16 is received in a respective one of the grooves and the diameter of the substantially inextensible bead cables is less than the maximum diameter of the side portions 10,11 of the associated groove. Consequently the beads are retained in the associated groove both when the tire is inflated and deflated. A bead retention system of this type forms the subject-matter of our above-mentioned co-pending U.K. published patent application No. 2,030,085A.

The sealing means 3 for the rim components 5 comprises an elastomeric liner member 21 of air-impermeable material, for example, a rubber such as butyl rubber, moulded to the profile of the rim 1. The liner member 21 extends circumferentially around the wheel rim 1 and provides a lining for each bead seat 6 and the rim portion 7. The liner member 21 is of substantially uniform thickness apart from two resiliently deformable portions 21a of increased thickness each of which lines the axially inner side portion 10 of a respective one of the grooves. The portions 21a are resiliently deformable to facilitate insertion of the seal element and tire bead into the groove during assembly and subsequently to hold the bead under compression in the associated groove and prevent the bead from slipping relative to the groove.

Figure 3:
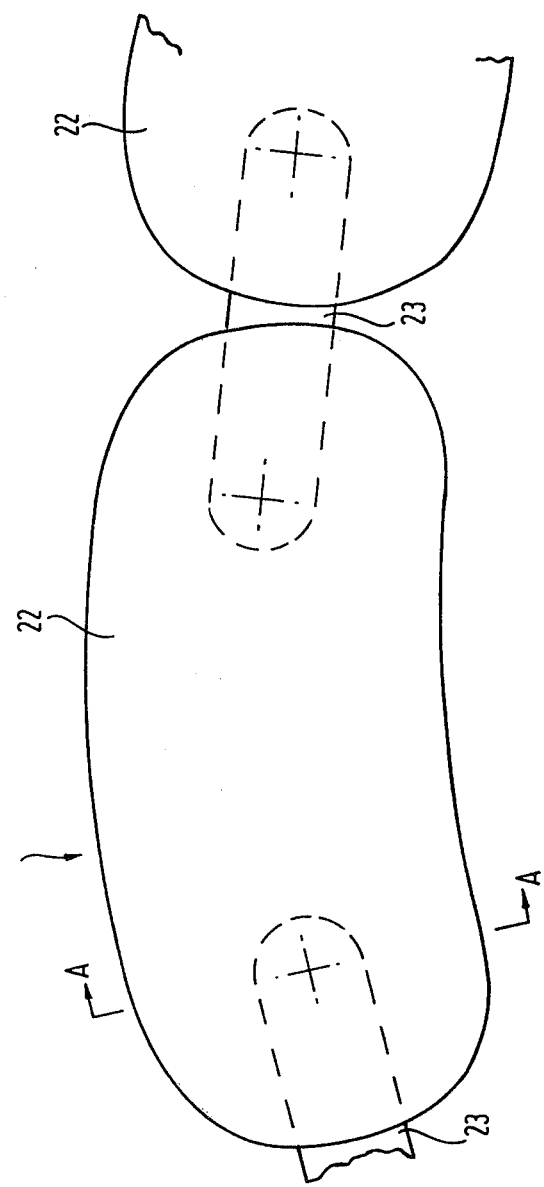
FIG. 3 is a side elevation of part of the support member shown in FIG. 1.
Figure 4:
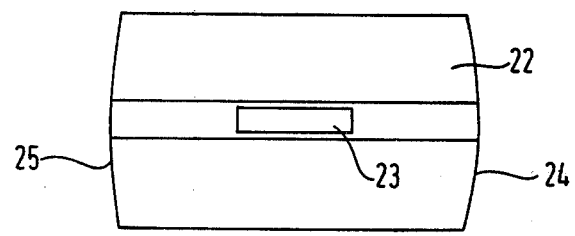
FIG. 4 is a section on the line A—A of FIG. 3.
Figure 5:
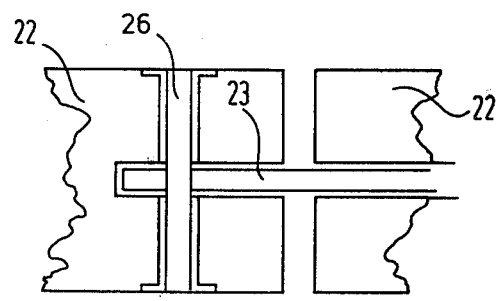
FIG. 5 is a plan view of the attachment means for two successive portions of the support member shown in FIG. 3.

The support member 4, shown in more detail in FIGS. 3, 4 and 5, comprises a plurality of rigid support elements 22 connected end-to-end by elongate links 23 pivotally mounted at their end regions on pivot pins 26 carried by the elements 22. Each support element 22 is similar and is of arcuate profile in side elevation, FIG. 3, so that the assembled support elements 22 forms an annular hoop which extends around the rim portion 7. As best shown in FIGS. 1 and 4 opposed surfaces 24,25 of each support element 22 are of arcuate cross-section having a convex profile, the surface 24 being complementary to the concave profile of the rim portion 7. Consequently when the support means 4 is positioned on the rim 1, the support means 4 is restrained against movement in an axial direction relative to the rim 1. A suitable lubricant (not shown) is provided between the radially inner surface 24 of the support member and the lining member 21 so as to reduce friction therebetween and facilitate relative rotation between the support member and the wheel rim under load-bearing conditions.

Assembly of the wheel rim 1, tire 2, sealing means 3 and support means 4 is as follows, the support means 4 is assembled and placed inside the tire 2. A section of the liner member 21 is pushed into position followed by one of the rim components 5. The tire 2 is raised to the vertical with the fitted section of the liner member 21 and rim element 5 at the top allowing the support member 4 to hang therefrom. The remaining section of the liner member is pushed into position followed by the other two rim elements 5 ensuring that the radially inner surface 24 of the support means 4 is opposite the annular rim portion 7. The usual wheel disc (not shown) is then attached to the flanges 13 to retain the components in position and the tire inflated via the usual valve (not shown).

As shown in FIG. 1 the support member 4 extends radially outwards from the rim 1 but is spaced from the crown of the tire 2 when the latter is inflated. In this condition the support member 4 is non-load-bearing and the dimensions of the support member 4, liner member 21 and wheel rim 1 are such that the support member 4 rotates with the wheel rim 1 i.e. there is no relative rotation.

When the tire is deflated, the tire beads 16 remain in the associated groove and the crown of the tire engages the radially outer surface 25 of the support member 4 which becomes load-bearing and prevents complete collapse of the sidewalls 15 so that control of the vehicle can be maintained. In this condition the support member 4 rotates relative to the wheel rim 1.

Rotation of the support member 4 relative to the wheel rim 1 compensates for the circumferential difference between the tire tread and the radially outer surface of the support member 4 so that the vehicle can be driven to a suitable place of repair with the tire 2 in the deflated condition without destroying the tire 2. At the same time the support member 4 is axially located on the rim 1 so that the possibility of the support member 4 engaging the sidewalls 15 and causing destruction of the tire 2 is substantially eliminated.

It will be understood that the invention is not restricted to the above-described embodiment which may be modified in a number of ways. For example, the annular rim portion 7 may have a convex profile in cross-section and the radially inner surface 24 of the support member 4 a complementary concave profile in cross-section.

The lubricant for reducing friction between the support member 4 and liner member 21 may be contained in containers located in recesses in the radially inner surface of the support member as described in our aforementioned co-pending U.K. published patent application No. 2,017,598A. Alternatively the liner member 21 may be made of a material which readily ruptures upon loads being applied to the support member 4 following deflation of the tire so that the support member 4 rotates on the rim portion 7 and relative rotation is not hindered by the liner member. In this arrangement the radially inner surface 24 of the support member and the annular rim portion 7 may be coated with a material having a low coefficient of friction e.g. Teflon (Registered Trade Mark).

The sealing means 3 may be replaced by individual seal elements which are located between the confronting surfaces of adjacent rim components.

It will be understood that the invention is not restricted to wheel rim of the above-described type in which the bead seats are formed by annular grooves but is applicable to any type of wheel rim having an annular rim portion between the bead seats which can be profiled to cooperate with the radially inner surface of the support member to axially locate the support member and allow relative rotation between the support member and the wheel rim. Thus the invention is applicable both to assemblies in which the rim is well-less and has a detachable flange to facilitate tire fitting and to assemblies in which the rim is a single component including a well to facilitate tire fitting. Where the rim is a single component the sealing means of the above-described embodiment may be omitted. Finally the invention is applicable to assemblies in which the tire is a radial ply, cross-ply or belted bias ply tire.

Having now described my invention-what I claim is:

1. An assembly comprising a well-less wheel rim having a pair of axially spaced radially outwardly directed bead retaining flanges and a respective bead seat adjacent to each flange, a rim portion extending from bead seat to bead seat of a diameter substantially equal to or greater than the diameter of said bead seats, an annular safety support member mounted on said rim portion between the bead seats, said support member projecting radially outwards beyond said flanges to support a pneumatic tire mounted on the rim when the tire is in a deflated condition and support member locating means to axially locate said support member on said rim in predetermined spaced relationship with respect to the beads of a tire mounted on the rim and to permit relative rotation between the support member and rim when the tire is in a deflated condition supported by the support member, said support member locating means being defined by confronting radially directed surfaces of said support member and said rim portion between said bead seats, which are of complementary non-uniform radial dimension.

2. An assembly according to claim 1, wherein the forces applied to the support member and the rim portion by the support member locating means act on the confronting radially directed surfaces of each member.

3. An assembly according to claim 2 wherein said support member locating means comprises an annular rib on one of said wheel rim and support member in engagement with an annular groove or recess of complementary cross-section in the other of said wheel rim and support member.

4. An assembly according to claim 3 wherein said locating means are of arcuate profile in transverse cross-section.

5. An assembly according to claim 4 wherein said rib is on said support member.

6. An assembly according to claim 5 wherein said rib is of shallow convex profile and extends across the entire width of said support member.

7. An assembly according to claim 2 wherein friction reducing means is provided between said confronting surfaces on said support member and said wheel rim.

8. An assembly according to claim 7 wherein said friction reducing means comprises a liquid lubricant contained in a container located in a recess in the radially inner surface of said support member and arranged to release said lubricant only when said support member becomes load-bearing.

9. An assembly according to claim 2 wherein said rim is formed by three or more arcuate segments.

10. An assembly according to claim 9 including sealing means for effecting an air-tight seal at the interface between adjacent rim components comprising a liner member which extends circumferentially around the outer surface of said rim and across substantially the entire axial width of said rim.

11. An assembly according to claim 2 including a tire mounted on said wheel rim, said tire having a pair of axially spaced tire beads each of which is seated on a respective one of said bead seats.

* * * * *